US007998240B2

(12) United States Patent
Yamaki et al.

(10) Patent No.: US 7,998,240 B2

(45) Date of Patent: Aug. 16, 2011

(54) PROCESS OF PREVENTING AS ELUTION FROM COPPER SLAG

(75) Inventors: Tetsuo Yamaki, Oita (JP); Katsuya Toda, Oita (JP)

(73) Assignee: Pan Pacific Copper Co., Ltd., Tokyo (JP)

( * ) Notice: Subject to any disclaimer, the term of this patent is extended or adjusted under 35 U.S.C. 154(b) by 338 days.

(21) Appl. No.: 12/323,189

(22) Filed: Nov. 25, 2008

(65) Prior Publication Data

US 2009/0223324 A1 Sep. 10, 2009

(30) Foreign Application Priority Data

Mar. 7, 2008 (JP) ................................ 2008-057917

(51) Int. Cl.
*B22F 9/04* (2006.01)
*C22B 7/04* (2006.01)

(52) U.S. Cl. ................................ 75/361; 75/710; 65/19

(58) Field of Classification Search .................... 75/361, 75/710

See application file for complete search history.

(56) References Cited

U.S. PATENT DOCUMENTS 6,000,242 A * 12/1999 George et al. .................... 65/19

FOREIGN PATENT DOCUMENTS

| | | | |
|---|---|---|---|
| JP | 8-301636 A | | 11/1996 |
| JP | 2005-139027 A | | 6/2005 |
| JP | 2005-289697 A | | 10/2005 |
| JP | 2005289697 A | * | 10/2005 |
| JP | 2006-327909 A | | 12/2006 |

OTHER PUBLICATIONS

Machine translation of JP 2005-289697 published Oct. 20, 2005.*

Japanese Office Action issued Mar. 2, 2010 in Japan Application No. 2008-057917.

English Language translation of the Official Action dated Dec. 14, 2010 for Japanese Application No. 2008-057917.

* cited by examiner

*Primary Examiner* — George Wyszomierski
*Assistant Examiner* — Tima M McGuthry-Banks
(74) *Attorney, Agent, or Firm* — Birch, Stewart, Kolasch & Birch, LLP

(57) ABSTRACT

A process of water-granulating copper smelting slag can readily suppress elution of As from the copper smelting slag. A process of water-granulating a copper smelting slag with granulation water in a circulating system, includes granulating the copper smelting slag with the granulation water; settling suspended solids from the granulation water circulating in the system in a settling tank followed by discharging part of the granulation water through the settling tank from the system; and feeding supplementary water having a concentration of As of 0.01 mg/L or less into the system in such an amount that the total amount of the granulation water circulating in the system is kept constant; wherein the amount of granulation water discharged through the settling tank is such that As eluted from the copper smelting slag after water granulation is 0.01 mg/L or less.

7 Claims, 3 Drawing Sheets

9
1
5
P P P 10
7
6
P
INDUSTRIAL WATER FEED
GRANULATION WATER DISCHARGE
8

PROCESS OF PREVENTING AS ELUTION FROM COPPER SLAG

FIELD OF THE INVENTION

The present invention relates to a process of suppressing elution of As from slag produced in a flash or MI furnace for smelting copper.

BACKGROUND OF THE INVENTION

Copper smelting slag is produced as a by-product in a flash or MI furnace in the course of smelting copper, and is generally landfilled or used as construction material after water granulation with high-pressure sea water or industrial water until it has a manageable size.

Elution of heavy metals such as As is a hassle in handling copper smelting slag. Typically, as the amount of copper smelting slag processed increases, heavy metals are gradually eluted from the slag and contaminate the granulation water that is recycled. Water granulation with such contaminated granulation water causes heavy metals in the granulation water to be trapped in the slag, and thus enhances elution of the heavy metal from the slag. Consequently, the heavy metal content in the circulating granulation water should be kept as low as possible for effectively suppressing elution of heavy metals from the slag.

Japanese Unexamined Patent Application Publication No. 2006-327909 provides a process that achieves satisfactory results on the elution test of slag by adding inorganic and organic coagulants to circulating granulation water to remove heavy metals such as As in a settling tank, and then recycling the coagulant-treated water as granulation water in a step of water-granulating copper smelting slag.

Japanese Unexamined Patent Application Publication No. 8-301636 provides a process of suppressing elution of heavy metals from slag discharged from a melting furnace by maintaining the granulation water alkaline with a pH of 11 or less, and filtering part of the granulation water to recycle.

Japanese Unexamined Patent Application Publication No. 2005-139027 provides a process of suppressing elution of heavy metals from slag produced from waste by removing suspended solids in a predetermined size which is contained in the granulation water through a coagulating or filtering means.

SUMMARY OF THE INVENTION

Any process in the above-mentioned patent documents may provide a certain suppressing effect. However, the process according to Japanese Unexamined Patent Application Publication No. 2006-327909 requires additional dedicated coagulant feed equipment and sediment removal equipment.

The process according to Japanese Unexamined Patent Application Publication No. 8-301636 requires installation of filtration equipment and its maintenance such as replacement of the filter. The process according to Japanese Unexamined Patent Application Publication No. 2005-139027 also requires a coagulating or filtering means, which leads to problems such as installation of such dedicated equipment or its maintenance. Unless such equipment is operated under a suitable management system, elution of heavy metals from slag cannot be stabilized in a low level, and may be aggravated.

It is unknown how effective the processes according to Japanese Unexamined Patent Application Publications No. 8-301636 and No. 2005-139027 is in suppression of elution of As, since As among heavy metals is not described therein.

Accordingly, an object of the present invention is to provide a process of water-granulating copper smelting slag which can readily suppress elution of As from the copper smelting slag.

As a result of extensive study to solve such problems, the inventors have discovered the following facts: The elution of As from copper smelting slag is suppressed by discharging part of granulation water from the circulating system, and feeding with supplementary water having a significantly low concentration of As; a copper smelting slag having a sufficiently low elution of As is produced without coagulation or membrane filtration equipment when the amount of water discharged from the circulating system is increased, in other words, the amount of newly added fresh water is sufficiently increased; and even when discharging from the settling tank a small amount of granulation water containing suspended solids having such a size that they can be removed by spontaneous settling, the granulation water can be maintained in a desired quality, and deposition of suspended solids in the circulating system can be prevented, which will facilitate maintenance of the equipment.

Traditionally, part of granulation water has usually been discharged from the circulating system. However, the granulation water has not been discharged neither in a sufficient amount to suppress elution of As from copper smelting slag nor at an appropriate location. As described in Paragraph 0002 of Japanese Unexamined Patent Application Publication No. 8-301636, large amounts of heavy metals were believed to be eluted from the resulting slag.

That is, the inventors have employed a system that has been believed not to work successfully, and accomplished a process of treating granulation water which yields a copper smelting slag having low elution of As and allows excellent maintainability.

The present invention accomplished based on these backgrounds is characterized as follows:

(1) A process of water-granulating a copper smelting slag with granulation water in a circulating system, comprising the following steps of: granulating the copper smelting slag with the granulation water, settling suspended solids from the granulation water circulating in the system in a settling tank followed by discharging part of the granulation water through the settling tank from the system; and feeding supplementary water having a concentration of As of 0.01 mg/L or less into the system in such an amount that the total amount of the granulation water circulating in the system is kept constant; wherein the amount of granulation water discharged through the settling tank is such that As eluted from the copper smelting slag after water granulation is 0.01 mg/L or less.

(2) The process according to (1), wherein the amount of granulation water discharged through the settling tank is such that the concentration of As in the granulation water in contact with the copper smelting slag is kept at 10 mg/L or less.

(3) The process according to (1) or (2), wherein the amount of granulation water discharged through the settling tank is 10% by volume or less based on the total amount of the granulation water circulating in the system.

(4) The process according to any one of (1) to (3), wherein the supplementary water is fed between the settling step and the granulating step.

(5) The process according to any one of (1) to (4), not comprising a step of adding a coagulant to the granulation water circulating in the system.

(6) The process according to any one of (1) to (5), not comprising a step of membrane-filtering the granulation water circulating in the system.

According to the present invention, (1) a copper smelting slag having a low elution of As can be readily obtained, and (2) the copper smelting slag meets the Environmental Quality Standards for Soil Contamination of As and can be used as concrete-aggregate, road bottoming material or landfill material, etc, resulting in expanded applications and resource saving.

Figure 1:
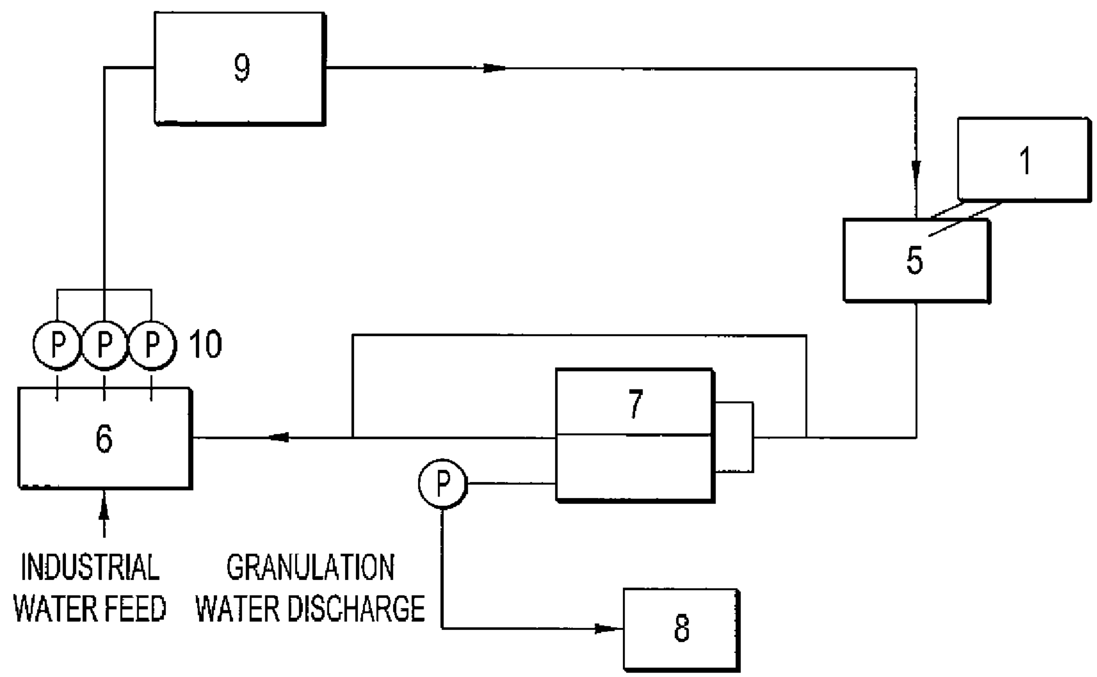
FIG. 1 is a flow sheet that shows water granulation process according to one embodiment of the present invention.

1 flash furnace (metal refining furnace)
2 slag gutter
3 water granulation gutter
4 granulation water
5 water granulation tank
6 water reservoir tank
7 settling tank
8 effluent treatment equipment
9 cooling tower
10 water-lifting pump
11 slag
12 water-granulated slag

DESCRIPTION OF THE PREFERRED EMBODIMENTS

The slag discharged from a flash or MI furnace in the step of smelting copper is generally composed of 35% to 45% by mass of Fe, 3% to 15% by mass of $Fe_3O_4$, 25% to 35% by mass of $SiO_2$, and 0.5% to 3% by mass of Cu. If such slag that also contains about 0.1% to about 0.2% by mass of As is water-granulated with clean As-free water, the granulated slag can typically have an elution of As of 0.01 mg/L or less. The term “elution” of As used herein refers to an observed value measured according to the leaching test of Environment Agency Notice 46 (1991, or Heisei 3).

Appropriate water granulation of copper smelting slag requires 10 $m^3$ to 20 $m^3$ of water per ton of slag. Consequently, when slag is discharged at a rate of, for example, one ton/min, granulation water is used at a rate of 10 $m^3$ to 20 $m^3$/min.

However, for water-granulating, it is not practical from a cost standpoint for clean washing water to be always used. In the standard water-granulating method, granulation water is used in a circulating system, and also in the present invention, granulation water is repeatedly used in a circulating system. Therefore, As is gradually concentrated in the granulation water. This As concentrated granulation water is trapped in the water-granulated slag, and enhances elution of As from the slag.

As a result, the basic concept of the present invention is to suppress elution of As from the water-granulated slag by reducing the concentration of As in the circulating granulation water.

In the invention, the method of the concentration of As in granulation water involves discharging part of granulation water circulating in the circulating system from the circulating system, and also feeding supplementary water having a concentration of As of 0.01 mg/L or less to the circulating system in such an amount that the total amount of the granulation water in the circulating system is kept constant. Also, the amount of granulation water discharged is such that As eluted from the copper smelting slag after water granulation is 0.01 mg/L or less. That is, the present invention involves effectively reducing the concentration of As contained in the circulating granulation water by controlling the location where the circulating granulation water is discharged and the amount discharged and the amount of fresh granulation water fed.

It has empirically been found that in water-granulating copper smelting slag having the above-mentioned As content with the above-mentioned amount of water, when the granulation water in contact with the slag has a concentration of As of 10 mg/L or less, elution of As from the copper smelting slag after water granulation is 0.01 mg/L or less. In one embodiment of a process of water-granulation according to the present invention, the amount of the granulation water discharged is maintained so that the concentration of As in the granulation water in contact with the copper smelting slag is kept at 10 mg/L or less, preferably 7.5 mg/L or less, and more preferably 5 mg/L or less.

A higher amount of water to be replaced decreases the concentration of As in the granulation water in the circulating system, but just replacing water is not economical due to need of significantly much water. Therefore, the present invention includes settling suspended solids having such a size that they can spontaneously settle and be removed from the granulation water in the circulating system followed by discharging part of the granulation water in the system from the settling tank used in this step. Discharging the granulation water from the settling tank, which removes suspended solids (primarily slag) containing heavy metals such as As, can effectively maintain the concentration of As in the granulation water low. Discharging of the granulation water from the settling tank through a pump can not only enhance the rate of removing suspended solids but also prevent suspended solids from depositing. This can also prevent slag from depositing in various locations in the circulating system, thereby saving maintenance of the equipment.

The granulation water in the settling tank is discharged from any point at which the concentration of suspended solids in the granulation water is relatively higher than that in the granulation water flown into the settling tank. However, from the view point of efficiency of removal of suspended solids and reduction in the amount of water to be replaced, it is preferred to discharge at or below one-half of the height of the settling tank, and more preferred from the bottom.

Even though the concentration of As contained in copper smelting slag discharged from the flash furnace fluctuates, this effect on the concentration of As in the granulation water can be moderated by increasing the amount of granulation water circulating in the circulating system. Moderated fluctuation in the concentration of As in the granulation water is effective in producing stable water-granulated slag. Therefore, the amount of the granulation water circulating in the circulating system is advantageously increased to such an extent that the amount of replacement water required to keep elution of As 0.01 mg/L or less from the copper smelting slag after water granulation is 10% by volume or less, preferably 8% by volume or less, and more preferably 6% by volume or less based on the total amount of the granulation water circulating in the circulating system.

For the purpose of reducing the concentration of As in the granulation water circulating in the circulating system, the supplementary water desirably has a concentration of As as low as possible. However, conventional industrial water, which generally has a concentration of As of 0.01 mg/L or less as measured according to a method specified in Japanese Industrial Standards K0102, Section 61.1, can provide sufficient effects.

In order to contact clean granulation water with slag, the supplementary water is preferably fed between the settling step and the step of granulating the copper smelting slag.

Although coagulants such as inorganic coagulants (for example, aluminum sulfate) or organic coagulants (for example, polymer coagulant) may be added to the granulation water to increase the settling efficiency, additional equipment needs to be installed for feeding these coagulants. In addition, the concentration of As in the granulation water can be sufficiently reduced even with no coagulants. A step of membrane-filtering suspended solids from the granulation water is also unnecessary, although it may be included. While granulation water is circulated in the circulation system, sulfur oxide contained in slag is dissolved in the granulation water upon water granulation, which leads to gradual reduction in pH of the granulation water. At a lower pH, heavy metals contained in the slag can be readily dissolved in the granulation water. It is preferred to add bases such as NaOH, $Ca(OH)_2$, or $CaCO_3$ to the granulation water circulating in the circulating system and maintain the water at a neutral pH (6 to 7). Such bases may be added at any position in the system. However, in order to bring the pH-adjusted granulation water into contact with slag, the supplementary water is preferably fed between the settling step and the step of granulating the copper smelting slag.

The concentration of As in the circulating granulation water can generally be calculated according to the following equation:

$$A_1 = A_0 \times B_0 / B_1$$

- $A_1$: the concentration of As in the granulation water after increase in the amount of the granulation water discharged,
- $A_0$: the concentration of As in the granulation water before increase in the amount of the granulation water discharged,
- $B_0$: the amount of granulation water discharged (before increase),
- $B_1$: the amount of granulation water discharged (after increase).

Therefore, provided that the concentration of As in the granulation water before increase in the amount of the granulation water discharged is 50 mg/L, and the amount of the granulation water discharged (before increase) is 0.1 $m^3$/min, for example, the amount of the granulation water discharged of 0.5 $m^3$/min is required to maintain the concentration of As in the granulation water at 10 mg/L or less.

According to the equation, the amount of the granulation water is calculated to be about 3% by volume based on the amount of the entire granulation water circulating in the circulating system, which is not so high. A higher amount of the granulation water discharged may increase the certainty. However, the amount actually discharged is preferably 5 times or less, and more preferably 3 times or less the calculated amount since the significantly high amount above the range impairs cost performance.

A preferred embodiment of the present invention will now be described in reference to a flow sheet showing water granulation process in FIG. 1 and a schematic view showing a slag gutter and a water granulation gutter in FIG. 2.

First, slag 11 discharged from a flash furnace (a metal refining furnace) 1 in the copper smelting step is poured into the water granulation gutter 3 through the slag gutter 2, is water-granulated with granulation water 4 flowing down the water granulation gutter 3, and falls as water-granulated slag 12 into a water granulation tank 5. The water-granulated slag is scraped by a bucket elevator (not shown) arranged in the water granulation tank 5, and delivered outside the system.

On the other hand, some of the granulation water collected in the water granulation tank 5 is transferred to a water reservoir tank 6. The other is transferred to a settling tank 7, is subject to removal of fine slag suspended from the granulation water, and is fed to the same water reservoir tank 6. In consideration of quality control of the granulation water and prevention of deposition of slag at various locations in the circulating system, the proportion of the granulation water transferred to the settling tank 7 may be adjusted, and can be, for example, 20% to 80% by volume, and typically 40% to 60% by volume.

The effluent is treated in effluent treatment equipment 8 outside the system. The effluent can also be treated in dedicated effluent treatment equipment that is arranged within the circulating system. In this case, dedicated coagulating and settling equipment and effluent treatment equipment need to be installed separately. Therefore, if any effluent treatment equipment is outside the water-granulating step, the effluent may be preferably fed to the equipment and treated therein together with effluents from other steps. This is more efficient due to no additional effluent treatment equipment.

In the water reservoir tank 6, industrial water is supplied to keep the amount of the granulation water in the system constant. The granulation water leaving the water reservoir tank 6 is fed to a cooling tower 9 by water-lifting pumps 10, and cooled by heat exchange through evaporation in the tower Part of the granulation water may also be fed from the cooling tower to the effluent treatment equipment for preventing concentration of heavy metals. The granulation water after cooling is fed to the water granulation gutter 3 through the plumbing, and reused for water granulation. In a series of steps, some of the granulation water is discharged from the settling tank, and also lost by evaporation or being trapped in the water-granulated slag (for example, about 2% to about 6% of the amount the circulating granulation water). The phrase "the amount of industrial water required to keep constant the amount of the granulation water in the system" means the amount inclusive of such losses.

EXAMPLES

While an example of the present invention will now be described, this example is only illustrative and not intended to limit the present invention.

Figure 2:
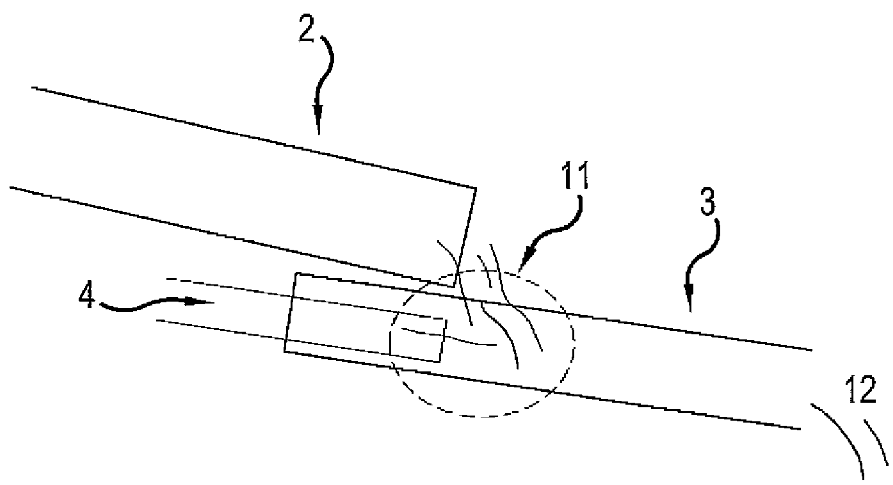
FIG. 2 is a schematic view that shows a slag gutter and a water granulation gutter (the lateral view)

A water granulation system was constructed in accordance with a flow sheet showing water granulation process in FIG. 1. Particular test conditions are as follows:

(Test Conditions)

The amount of copper smelting slag discharged from the flash furnace: 1.2 kg/min The concentration of As in slag: As: 0.10% to 0.20% by mass

*Slag before water granulation was sampled and analyzed with an ICP emission spectrophotometer (SII NanoTechnology Inc. Model SPS3100) for the concentration of As in slag.

The amount of granulation water: 17 $m^3$/min

The proportion of the granulation water passing through the settling tank 7: 50%

The settling tank size: W 12 m by D 6 m by H 3.5 m

The point in the settling tank from which the effluent is discharged: The point 3.0 m above the bottom of the settling tank The amount discharged from the settling tank into the effluent treatment equipment: 1.0 $m^3$/min The amount discharged from the cooling tower into the effluent treatment equipment: 0 $m^3$/min (Before this test the effluent was discharged only from the cooling tower at a discharged rate of 0.1 $m^3$/min.)

The amount of industrial water fed: 1.0 $m^3$/min

No step of adding coagulant or membrane filtering

NaOH: added to the water reservoir tank in the sufficient amount to maintain the pH of the granulation water at 6 to 7

(Test Results)

Figure 3:
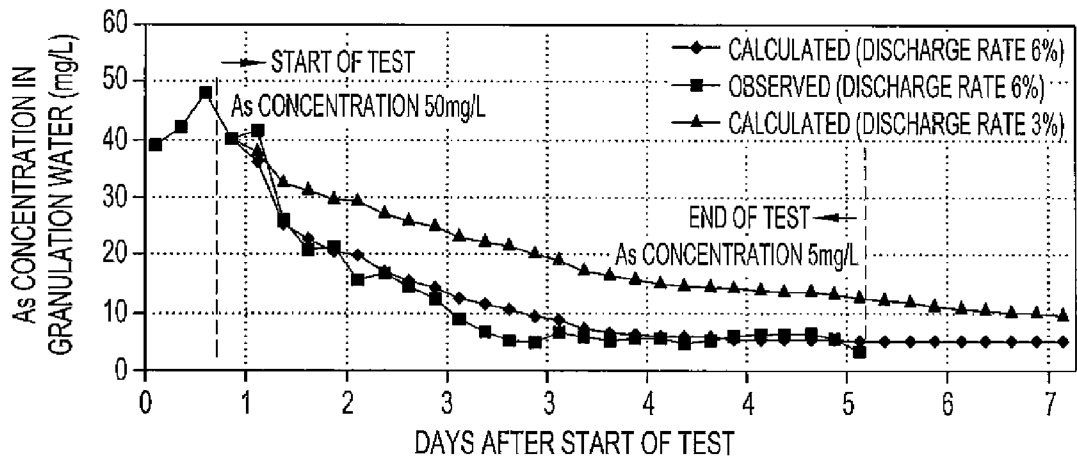
FIG. 3 is a graph that shows the change in the concentration of As in the granulation water in Example.

FIG. 3 shows the change in the concentration of As in the granulation water. The concentration of As was measured according to JIS K0102, Section 61.1.

In the drawing, ■ represents observed values and ♦ represents calculated values.

The calculated value is calculated based on the balance between the amount of the granulation water and the concentration of As, and it is predicted that when the amount discharged is ten-fold, the value decreases to one tenth of the value before the test in about 5 days, and then reaches an equilibrium state.

The concentration of As in the granulation water before the test (the amount discharged, 0.1 $m^3$/min) is 50 mg/L. When the amount discharged is increased to 1.0 mg/L, the concentration of As in the granulation water started to gradually decrease, and in 5 days after the start of the test, decreased to 5 mg/L, which is one tenth of the value before the test, similarly to the calculated value.

Figure 4:
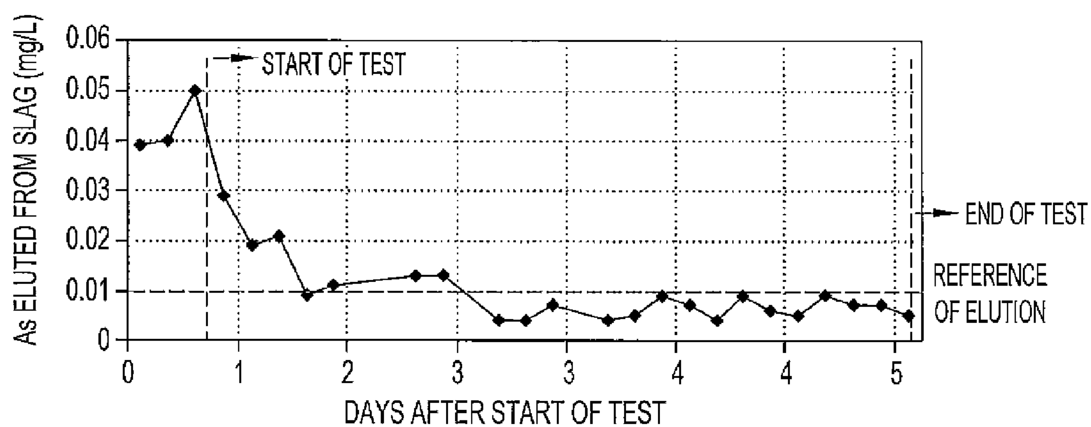
FIG. 4 is a graph that shows the change in the amount of As eluted in Example.

FIG. 4 shows the amount of As eluted from the resultant water-granulated slag according to the leaching test according to Environment Agency Notice 46. Like the concentration of As in the granulation water, the amount of As eluted from the slag started to decrease after the start of the test, and in 5 days, decreased approximately to 0.01 mg/L or less, which is the Environmental Quality Standards for Soil.

Figure 5:
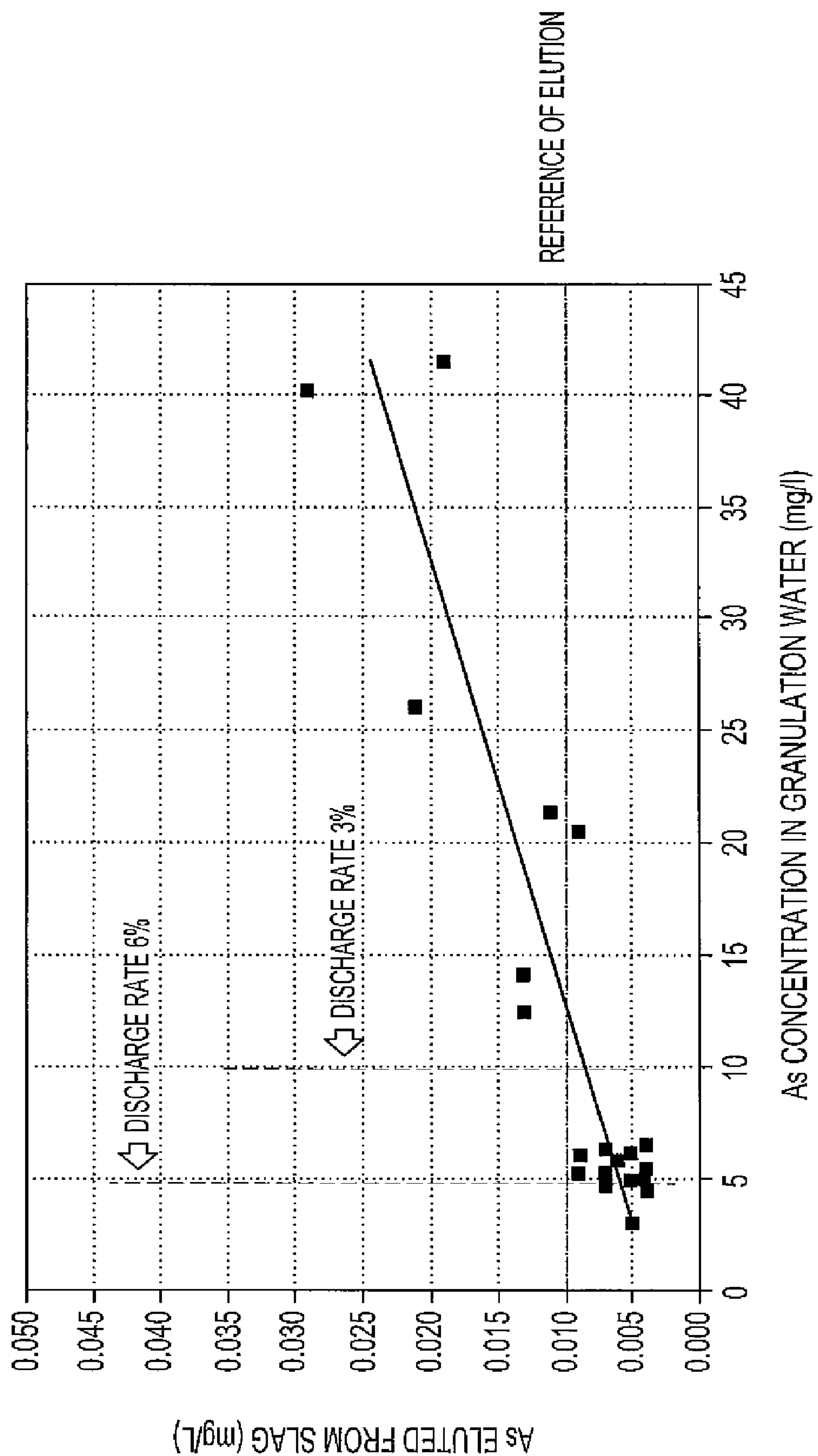
FIG. 5 is a graph that shows the relationship between the concentration of As in the granulation water and the amount of As eluted from the water-granulated slag.

FIG. 5 shows the relationship between the concentration of As in the granulation water and the amount of As eluted from the water-granulated slag obtained from the test results. FIG. 5 demonstrates that if the concentration of As in the granulation water is 10 mg/L or less, the amount of As eluted from the slag is approximately 0.01 mg/L or less, which meets the Environmental Quality Standards for Soil.

As described above, when the amount discharged is ten-fold, the concentration of As in the granulation water decreased to 5 mg/L that is one tenth of the value before the test as calculated. Consequently, it is found that the amount discharged should be five-fold, that is, 0.5 $m^3$/min (3% of the amount of the granulation water) for the concentration of As in the granulation water of 10 mg/L or less.

What is claimed is:

1. A process of water-granulating a copper smelting slag with granulation water in a circulating system, comprising the following steps of:

granulating the copper smelting slag with the granulation water; settling suspended solids from the granulation water circulating in the system in a settling tank followed by discharging part of the granulation water through the settling tank from the system, a discharging point of the settling tank is at or below one-half of the height of the settling tank;

feeding supplementary water having a concentration of As of 0.01 mg/L or less into the system in such an amount that the total amount of the granulation water circulating in the system is kept constant; and adding a base which is at least one selected from the group consisting of NaOH, $Ca(OH)_2$ and $CaCO_3$ to the granulation water, wherein the amount of granulation water discharged through the settling tank is such that As eluted from a resultant copper smelting slag after water granulation according to a leaching test is 0.01 mg/L or less.

2. The process according to claim 1. wherein the concentration of As in the granulation water circulating in the system and in contact with the copper smelting slag is kept at 10 mg/L or less.

3. The process according to claim 1, wherein the amount of granulation water discharged through the settling tank is 10% by volume or less based on the total amount of the granulation water circulating in the system.

4. The process according to claim 1, wherein the supplementary water is fed between the settling step and the granulating step.

5. The process according to claim 1, not comprising a site of adding a coagulant to the granulation water circulating in the system.

6. The process according to claim 1, not comprising a step of membrane-filtering the granulation water circulating in the system.

7. The process according to claim 1, wherein the base is added to the granulation water after the settling step and before the granulating step.

* * * * *